United States Patent
Breu et al.

(10) Patent No.: US 11,390,170 B2
(45) Date of Patent: Jul. 19, 2022

(54) POWER SUPPLY DEVICE HAVING A FUEL CELL ARRANGEMENT AND METHOD FOR LOWERING VOLTAGE IN A FUEL CELL ARRANGEMENT

(71) Applicant: Audi AG, Ingolstadt (DE)

(72) Inventors: Martin Breu, Rattiszell (DE); Maximilian Schiedermeier, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 17/263,511

(22) PCT Filed: Jun. 5, 2019

(86) PCT No.: PCT/EP2019/064639
§ 371 (c)(1),
(2) Date: Jan. 26, 2021

(87) PCT Pub. No.: WO2020/020524
PCT Pub. Date: Jan. 30, 2020

(65) Prior Publication Data
US 2021/0229557 A1    Jul. 29, 2021

(30) Foreign Application Priority Data
Jul. 27, 2018   (DE) ............... 10 2018 212 533.3

(51) Int. Cl.
*B60L 3/00* (2019.01)
*B60L 50/71* (2019.01)
(Continued)

(52) U.S. Cl.
CPC ............... *B60L 3/0053* (2013.01); *B60L 3/04* (2013.01); *B60L 50/71* (2019.02); *B60L 58/30* (2019.02);
(Continued)

(58) Field of Classification Search
CPC .......... B60L 3/0053; B60L 3/04; B60L 50/71; B60L 58/30; H01M 8/04246;
(Continued)

(56) References Cited

U.S. PATENT DOCUMENTS 5,105,142 A    4/1992   Takabayashi

FOREIGN PATENT DOCUMENTS

CA    2995319 C   *   2/2019   .......... B60L 11/1887
DE    103 04 557 A1    8/2004
(Continued)

*Primary Examiner* — Hal Kaplan
(74) *Attorney, Agent, or Firm* — Seed IP Law Group LLP

(57) ABSTRACT

A power supply device for the electric power supply of at least one consumer is provided having a primary power grid in which there is present a fuel cell arrangement comprising electric contacts which includes a discharge circuit switched in parallel and connected to the electric contacts comprising a switch element activatable by means of a controller across a switch line as well as a resistance element and having a DC-DC converter which is present in the primary power grid by which the primary power grid is connected to a secondary power grid characterized in that the discharge circuit comprises a safety device or a safety function, which holds the switch element in an opened state and thereby makes the discharge circuit inactive for as long as an actuating possibility exists via the switch line, and which places the switch element in a closed state and thereby makes the discharge circuit active for lowering the voltage of the fuel cell arrangement once the actuating possibility via the switch line is denied. Furthermore, a method for lowering the voltage of a fuel cell arrangement of a power supply device is also provided.

10 Claims, 1 Drawing Sheet

(51) Int. Cl.
  *B60L 58/30*    (2019.01)
  *B60L 3/04*     (2006.01)
  *H01M 8/04223*  (2016.01)
  *H01M 8/04537*  (2016.01)
  *H01M 8/04664*  (2016.01)
  *H01M 8/04955*  (2016.01)
  *H01M 16/00*    (2006.01)
  *H02J 7/00*     (2006.01)

(52) U.S. Cl.
  CPC ... *H01M 8/04246* (2013.01); *H01M 8/04559* (2013.01); *H01M 8/04664* (2013.01); *H01M 8/04955* (2013.01); *H01M 16/006* (2013.01); *H02J 7/0063* (2013.01); *H01M 2250/20* (2013.01)

(58) Field of Classification Search
  CPC ......... H01M 8/04559; H01M 8/04664; H01M 8/04955; H01M 2250/20; H02J 7/0063
  USPC ................................................ 307/9.1, 10.1
  See application file for complete search history.

(56) References Cited

FOREIGN PATENT DOCUMENTS

| | | |
|---|---|---|
| DE | 10 2004 057 693 A1 | 6/2006 |
| DE | 10 2008 061 585 A1 | 6/2010 |
| DE | 10 2009 055 053 A1 | 6/2011 |
| DE | 10 2011 084 006 A1 | 4/2013 |
| DE | 10 2012 100 951 A1 | 8/2013 |
| DE | 10 2013 201 995 A1 | 8/2013 |
| DE | 10 2012 204 866 A1 | 10/2013 |
| DE | 10 2012 218 584 A1 | 4/2014 |
| DE | 10 2014 016 239 A1 | 6/2015 |
| DE | 11 2015 001 672 T5 | 12/2016 |
| DE | 10 2016 008 057 A1 | 2/2017 |
| DE | 10 2016 123 209 A1 | 6/2018 |
| JP | 4-101362 A | 4/1992 |
| JP | 8-205401 A | 8/1996 |
| JP | 2004-253220 A | 9/2004 |
| JP | 2008-108484 A | 5/2008 |
| JP | 2009-254169 A | 10/2009 |

* cited by examiner

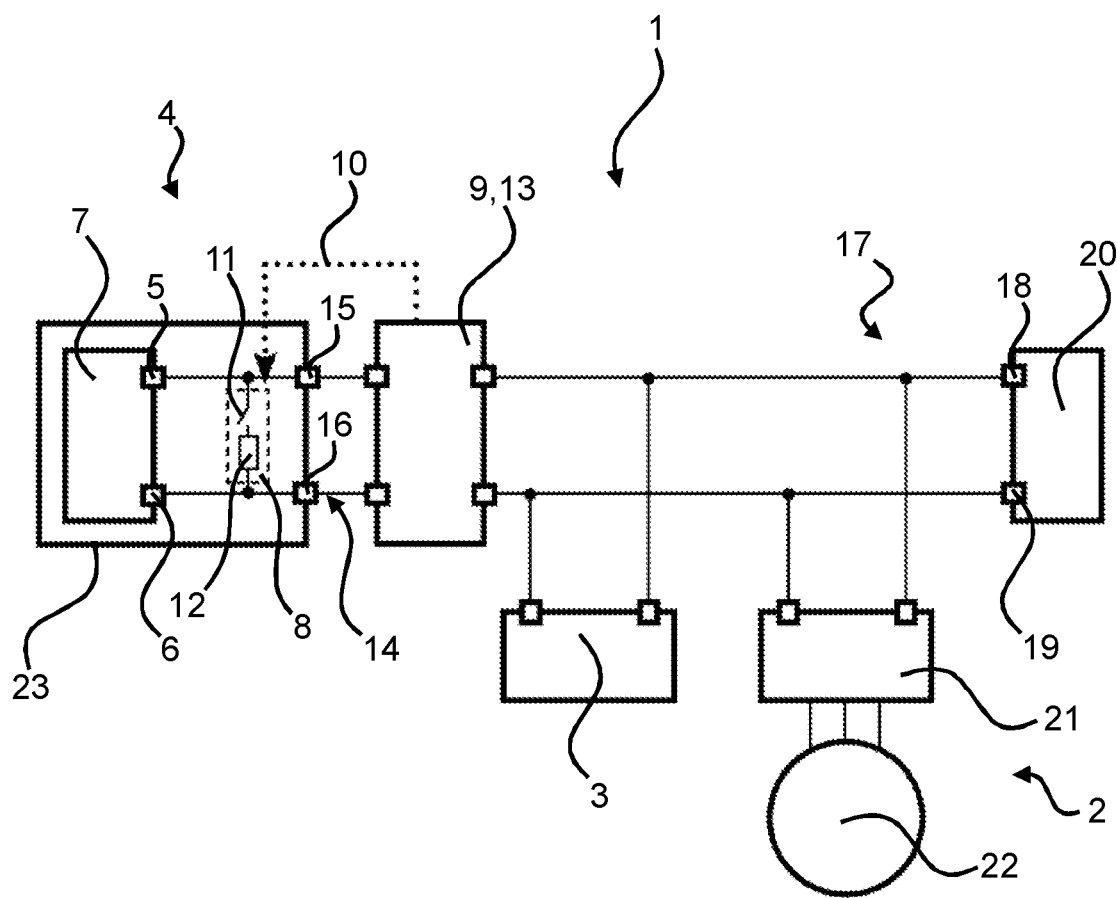

POWER SUPPLY DEVICE HAVING A FUEL CELL ARRANGEMENT AND METHOD FOR LOWERING VOLTAGE IN A FUEL CELL ARRANGEMENT

BACKGROUND

Technical Field

Embodiments of the invention relate to a power supply device for the electric power supply of at least one consumer. Furthermore, embodiments of the invention relate to a method for lowering the voltage of a fuel cell arrangement in such a power supply device.

Description of the Related Art

A power supply device of the above mentioned kind may be used, for example, in fuel cell vehicles where the fuel cell arrangement provides voltages larger than 60 Volt (V) and also in many instances when the supply of reactant to the fuel cell arrangement has already been halted. These high voltages are created by the reactants still present in the fuel cell arrangement, but not yet totally utilized.

For such voltages, amounting to more than 60 Volt, a safety aspect needs to be taken into account in principle, as they may cause dangerous shock currents when touched. Moreover, special protection rules must also be heeded in regard to touch protection for such voltages. Therefore, expensive touch-proof plug connections are in use, resulting in substantial added cost in the development and production. Especially in the case of the high-voltage interface between the fuel cell arrangement and a DC-DC converter, massive added expense is incurred for a touch-proof high-voltage/high-current plug connection. On the whole, there is increased cost for the production, the repair and the servicing of the fuel cell arrangement, since special safety measures need to be taken for touch protection.

In DE 10 2009 055 053 A1, a method and a device are described for the discharging of an energy accumulator, especially an intermediate capacitor in a high-voltage grid of a motor vehicle, in order to lower the voltages which are greater than 60 Volt (high voltage).

In DE 10 2012 204 866 A1, a discharge circuit is likewise shown for the discharging of an energy accumulator, especially for the discharging of an intermediate capacitor, the document describing a device and a method for checking and diagnosis of this discharge circuit.

U.S. Pat. No. 5,105,142 A likewise describes a discharge circuit for limiting the electric output voltage of a fuel cell. This discharge circuit becomes active in the event of an interruption in the operation of the fuel cell.

In DE 10 2012 218 584 A1, a load resistor is switched in parallel with the fuel cell, which can be switched in by means of a switch element at least during a heating phase of the fuel cell layout as the sole or at least substantially the sole consumer. Thus, during the starting process of the fuel cell arrangement, first of all, only the load resistor is used, in order to make possible an especially short heating phase for the fuel cell arrangement. But this document also teaches that the load resistor can form a discharge resistor in a discharge circuit of the fuel cell arrangement.

BRIEF SUMMARY

A power supply device and a method for lowering the voltage of a fuel cell arrangement of a power supply device, as described herein, lead to a fault-secure and compact design.

A power supply device for the electric power supply of at least one consumer may have a primary power grid, in which there is present a fuel cell arrangement comprising electric contacts, which includes a discharge circuit switched in parallel and connected to the electric contacts, comprising a switch element activatable by a controller across a switch line as well as a resistance element. There is furthermore present in the primary power grid a DC-DC converter, by which the primary power grid is connected to a secondary power grid.

The discharge circuit here comprises a safety device or a safety function, which holds the switch element in an opened state and thereby makes the discharge circuit inactive for as long as an actuating possibility exists via the switch line, and which places the switch element in a closed state and thereby makes the discharge circuit active for lowering the voltage of the fuel cell arrangement once the actuating possibility via the switch line is denied.

This ensures that, even in the event of an accident, a discharging of the fuel cell arrangement will occur, even if the actuating possibility of the switch element of the discharge circuit no longer exists. Of course, the discharge circuit may also be actuated by means of the controller in a servicing or maintenance situation, in order to make possible a reliable discharging of the fuel cell arrangement to a level below 60 Volt.

In the present case, the consumer of the power supply device may be for example a drive mechanism with a drive unit. If it is connected electrically to the secondary power grid, it may serve for propelling a motor vehicle, i.e., providing a driving torque intended to drive the motor vehicle. For this, the drive mechanism has at least one drive unit, which is equipped as an electric machine and which can be supplied with electric energy via the primary power grid and/or the secondary power grid. Of course, the drive mechanism may also be equipped as a hybrid drive mechanism and accordingly comprise, in addition to the drive unit, at least one further drive unit, which is of a different type than the drive unit. The further drive unit is present, for example, as an internal combustion engine or the like. The primary power grid and the secondary power grid may form an onboard network of the motor vehicle or represent at least one portion of such an onboard network. In the primary power grid there is provided a first current source in the form of the fuel cell arrangement. The fuel cell arrangement may be present in the form of a single fuel cell or, alternatively, as a fuel cell stack with multiple fuel cells. The fuel cell arrangement serves for the reliable supplying of the onboard network with electric energy.

In order to design the power supply device with low cost in regard to its construction, it has proven to be advantageous when the controller for actuating of the switch element is formed by the DC-DC converter itself.

Moreover, in order to make possible a reliable movement of the switch element between the opened state and the closed state, it has proven to be expedient when the switch element is an electromechanical switch element, a contactor, or a semiconductor switch. As the semiconductor switch one may consider, for example, an IGBT (bipolar transistor with insulated gate). Alternatively, a MOS-FET (metal oxide/semiconductor field-effect transistor) may also be used as the switch element, especially one of the type "conducting in the non-actuated state" ("normally conducting"), in order to fulfill the safety function.

It has proven to be advantageous when the resistance element is a high-performance resistor, since this is suitable for safely discharging the maximum residual energy of the fuel cell arrangement down to voltages below 60 Volt, within the legally mandated time.

Alternatively or additionally, the resistance element may also be formed as a PTC (positive temperature coefficient) heater in the form of a PTC resistor, which upon absorbing energy from the fuel cell arrangement generates heat and dissipates it to the surroundings, thus likewise making possible a lowering of the voltage of the fuel cell arrangement.

Alternatively or additionally, the voltage in the fuel cell arrangement can also be lowered by a resistance element formed as a Z-diode. This is characterized in that it can withstand a heavy current flow, which may be needed in order to lower the fuel cell voltage below a predetermined or predeterminable fuel cell voltage, thus especially below 60 Volt.

Furthermore, it has proven to be advantageous when the resistance element is formed as a power semiconductor switch which can be operated in a linear mode. This also makes possible a large current withdrawal from the fuel cell arrangement, resulting in a lowering of the fuel cell voltage to the required extent. It should be pointed out that individual combinations of high-performance resistor, PTC heater, Z-diode and power semiconductor switch are also possible when realizing the resistance element in a more complex design.

Especially in the event of maintenance or repair it has proven to be advantageous when an interface is formed between the fuel cell arrangement and the DC-DC converter, and the controller is designed to place the switch element in the closed state once the interface is disconnected or opened. Thus, once this interface is disconnected or opened, the discharge circuit is made active and results in a discharging of the fuel cell arrangement below a harmless level.

A particularly compact and especially touch-proof configuration of the power supply device is characterized in that the discharge circuit is structurally integrated in a fuel cell housing of the fuel cell arrangement. Hence, it is assured that no one of the workshop personnel or rescue forces gets into the interface zone between the electric contacts of the fuel cell arrangement and the discharge circuit. Therefore, the fuel cell housing likewise serves as a touch protection in the broadest sense, as well.

A second current source in the form of a battery may be provided in the secondary power grid. This battery likewise serves for the dependable supplying of the onboard network with electric energy and it is provided for an interim storage of energy, especially energy which was provided by means of the fuel cell arrangement.

The consumer, i.e., the electric machine, is electrically connected to the secondary power grid and may be electrically connected permanently to the battery during a driving operation. The connecting of the consumer in the form of a drive unit to the secondary power grid can be realized for example by a converter, especially a pulse inverter.

The method is carried out by a power supply device comprising a fuel cell arrangement, having a secondary power grid and a primary power grid, wherein the fuel cell arrangement comprising electric contacts is present in the primary power grid, which arrangement includes a discharge circuit switched in parallel and connected to the electric contacts, wherein the discharge circuit comprises a switch element activatable by means of a controller across a switch line as well as a resistance element, and wherein a DC-DC converter is present in the primary power grid, by means of which the primary power grid is connected to the secondary power grid. The method involves in particular the following steps:

a. halting a supply of reactant to the fuel cell arrangement,
b. actuating the switch element of the discharge circuit across the switch line by means of the DC-DC converter, formed as a controller, such that the switch element is commanded to pass into a closed state, and
c. once the switch element is in the closed state, at least partial consuming of the electric energy generated by the fuel cell arrangement by the resistance element.

By means of this method, an especially compact power supply device can be realized, since the DC-DC converter here serves as a controller for the discharge circuit and thus for activating the switch element.

It has proven to be advantageous when an output voltage of the fuel cell arrangement is detected, and the electric energy is consumed through the resistance element until the output voltage of the fuel cell arrangement has dropped below a predetermined or predeterminable voltage value. By means of to this step, it is ensured that no more life-threatening voltages are present on the fuel cell arrangement, so that the voltage limit value amounts, for example, to 60 Volt.

In order to provide additional fault safety, it has proven to be expedient when the switch element also passes into the closed state once the actuating possibility of the switch element via the switch line by means of the controller is denied.

Furthermore, it is advantageous when an interface is present between the fuel cell arrangement and the DC-DC converter, and the actuating of the switch element by means of the controller occurs upon disconnecting or opening the interface, such that the switch element is commanded to pass into a closed state. The disconnecting of the interfaces thus serves as a trigger signal for discharging the fuel cell arrangement, which further increases its operating safety.

BRIEF DESCRIPTION OF THE SEVERAL VIEWS OF THE DRAWINGS

Further advantages, features and details are provided in the claims, the following description, and the drawing.

FIG. 1 illustrates a schematic representation of a power supply device for the electric power supply of at least one consumer in the form of a drive mechanism with drive unit for driving a motor vehicle.

DETAILED DESCRIPTION

FIG. 1 shows a schematic representation of a power supply device 1 for the electric power supply of a first consumer 2 and a second consumer 3. The present power supply device 1 may also supply further consumers with electric energy.

The power supply device 1 comprises a primary power grid 4, in which a fuel cell arrangement 7 is present, having a first electric contact 5 and a second electric contact 6. Moreover, the power supply device 1 comprises a secondary power grid 17, in which a battery 20 is present. The battery 20 is designed to energize the consumers 2, 3.

The consumer 2 comprises a drive unit 22, which is present in the form of an electric machine. This electric machine is typically operable by means of a three-phase alternating current and may be formed as a drive motor for a motor vehicle. Since the primary power grid 4 and also the secondary power grid 17 furnish a high voltage and a direct current, the consumer 2 is additionally associated with the inverter 21, which converts the direct current into the three-phase alternating current. In a further development of the consumer 2, the drive unit 22 may also be used as a generator, so that energy of the battery 20 generated for example during the braking process by the drive unit 22 can be fed back through the inverter 21.

The consumer 3 may likewise be connected to the onboard network formed from the primary power grid 4 and the secondary power grid 17. The consumer 3 may be, for example, ancillary units of the fuel cell arrangement 7, a charging device, a 12V DC-DC converter, a high-voltage heater, an electric air conditioning compressor or the like.

As can be seen from FIG. 1, the primary power grid 4 is connected to the secondary power grid 17 across a DC-DC converter 13. The fuel cell arrangement 7 comprises a first primary power grid terminal 15 and a second primary power grid terminal 16, which in the present case are arranged on a fuel cell housing 23 and connected by lines to the DC-DC converter 13. Thus, an interface 14 is created between the DC-DC converter 13 and the fuel cell arrangement 7, which can be used for example for service or repair purposes, in particular, reversibly disconnected or opened.

The battery 20 in the secondary power grid 17 comprises, accordingly, a first secondary power grid terminal 18 and a second secondary power grid terminal 19. The DC-DC converter 13 connects the first primary power grid terminal 15 to the first secondary power grid terminal 18. The DC-DC converter 13 moreover connects the second primary power grid terminal 16 to the second secondary power grid terminal 19.

The present power supply device 1 is characterized by a discharge circuit 8 switched in parallel and connected to the electric contacts 5, 6, having a switch element 11 activated by means of a controller 9 across a switch line 10 as well as a resistance element 12. The discharge circuit 8 has a safety device or a safety function, which holds the switch element 11 in an opened state and thereby makes the discharge circuit 8 inactive for as long as an actuating possibility exists through the switch line 10, and places the switch element 11 in a closed state, thereby making the discharge circuit 8 active for lowering the voltage of the fuel cell arrangement 7, once the actuating possibility through the switch line 10 is denied.

In the present instance, the discharge circuit 8 is arranged inside a fuel cell housing 23 and thus it is structurally integrated in it. This ensures that a reliable discharging of the fuel cell arrangement 7, and thus of the fuel cell stack, occurs upon disconnecting the interface 14, so that a simplified design for the power supply device 1 becomes possible.

The actuating of the switch element 11 occurs in the present case by means of the DC-DC converter 13, so that the DC-DC converter 13 forms the controller 9 for actuating the discharge circuit 8. The use of a controller 9 remote from the DC-DC converter 13 is likewise possible.

If servicing of the power supply device 1, the fuel cell system, or the fuel cell vehicle should occur, first of all, the supply of reactant to the fuel cell arrangement 7 is halted. After this, the switch element 11 of the discharge circuit 8 is actuated across the switch line 10 by means of the DC-DC converter 13 formed as the controller 9 so that the switch element 11 is commanded to change to a closed state, and as soon as the switch element 11 is in the closed state, the electric energy generated by the fuel cell arrangement 7 is consumed at least partly by the resistance element 12. This consuming of the electric energy may occur until the output voltage of the fuel cell arrangement 7 has fallen below a predetermined or predeterminable voltage value. For this, the fuel cell arrangement 7 has a voltage meter, which detects the voltage of the fuel cell stack as a whole, or which is designed as a single cell voltage meter to measure voltages of the individual fuel cells of the fuel cell arrangement 7. In the present case, the switch element 11 then also changes to the closed state when an actuating possibility of the switch element 11 via the switch line 10 by means of the controller 9 is denied, which may occur for example during an accident.

However, if it should be forgotten to undertake an actuating of the switch element 11 by the controller 9 in order to bring about a discharging of the fuel cell arrangement 7, it is also possible for the actuating of the switch element 11 by means of the controller 9 to occur automatically upon disconnecting or opening of the interface 14, thereby producing a reliable discharging of the fuel cell.

The above described method and the above described power supply device 1 provide high operating safety with a compact design at the same time. The same thus holds for a drive mechanism which is supplied with electric energy by such a power supply device 1. Due to the configuration of the DC-DC converter 13 as a controller 9 for actuating the switch element 11, the power supply device 1 can be very simple in design, so that space and cost advantages will result when used in a motor vehicle.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A power supply device for supplying electric power to at least one consumer comprising:
   a primary power grid including:
      a fuel cell arrangement having electric contacts;
      a discharge circuit switched in parallel and connected to the electric contacts, the discharge circuit including a switch element activatable by a controller across a switch line and a resistance element; and
      a DC-DC converter by which the primary power grid is connected to a secondary power grid; and
   wherein the discharge circuit includes a safety device or a safety function that holds the switch element in an opened state and thereby makes the discharge circuit inactive for as long as an actuating possibility exists via the switch line, and that places the switch element in a closed state and thereby makes the discharge circuit active for lowering the voltage of the fuel cell arrangement once the actuating possibility via the switch line is denied.

2. The power supply device according to claim 1, wherein the controller for actuating the switch element is formed by the DC-DC converter.

3. The power supply device according to claim 1, wherein the switch element is an electromechanical switch element, a contactor, or a semiconductor switch.

4. The power supply device according to claim 3, wherein the semiconductor switch is an IGBT or a MOS-FET.

5. The power supply device according to claim 1, wherein the resistance element is a high-performance resistor, a PTC heater, a Z-diode, a power semiconductor switch in linear operation, or a consumer.

6. The power supply device according to claim 1, wherein an interface is formed between the fuel cell arrangement and the DC-DC converter, and the controller is designed to place the switch element in the closed state once the interface is disconnected or opened.

7. A method for lowering a voltage of a fuel cell arrangement of a power supply device having a secondary power grid and a primary power grid, wherein the fuel cell arrangement includes electric contacts and is present in the primary power grid, which fuel cell arrangement includes a discharge circuit switched in parallel and connected to the electric contacts, wherein the discharge circuit comprises a switch element activatable by a controller across a switch line and a resistance element, and wherein a DC-DC converter is present in the primary power grid, via which the primary power grid is connected to the secondary power grid, the method comprising:

halting a supply of reactant to the fuel cell arrangement;

actuating the switch element of the discharge circuit across the switch line by the DC-DC converter, formed as a controller, such that the switch element is commanded to pass into a closed state; and once the switch element is in the closed state, at least partial consuming of the electric energy generated by the fuel cell arrangement by the resistance element.

8. The method according to claim 7, wherein an output voltage of the fuel cell arrangement is detected, and in that the electric energy is consumed through the resistance element until the output voltage of the fuel cell arrangement has dropped below a predetermined or predeterminable voltage value.

9. The method according to claim 7, wherein the switch element also passes into the closed state once the actuating possibility of the switch element via the switch line by the controller is denied.

10. The method according to claim 7, wherein an interface is present between the fuel cell arrangement and the DC-DC converter, and in that the actuating of the switch element by the controller occurs upon disconnecting or opening the interface.

* * * * *